Patented July 13, 1948

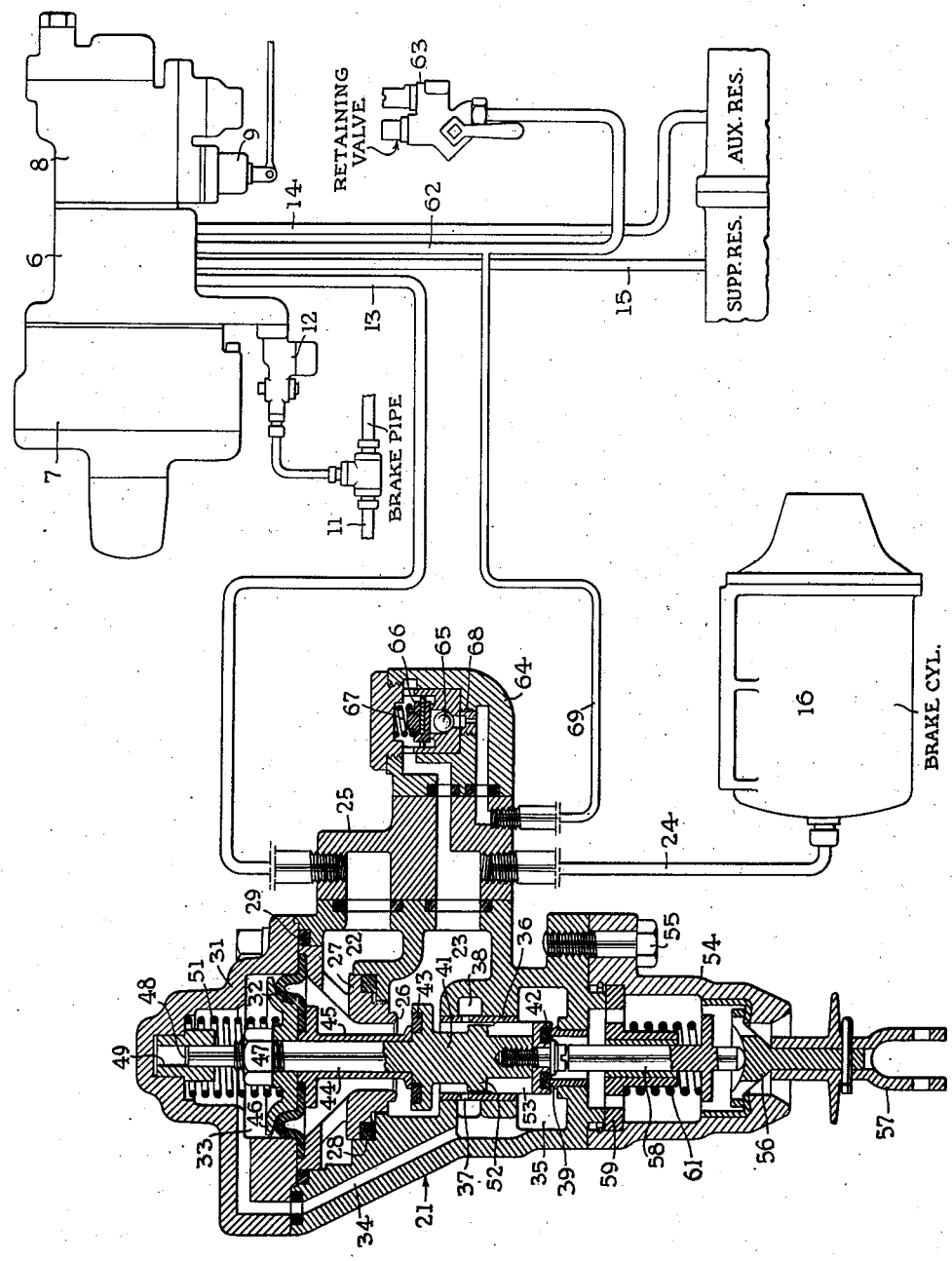

2,444,993

UNITED STATES PATENT OFFICE 2,444,993

BRAKE CYLINDER RELEASE VALVE WITH RETAINER CONTROL

William F. Klein, Watertown, N. Y., assignor to The New York Air Brake Company, a corporation of New Jersey Application March 24, 1947, Serial No. 736,726

8 Claims. (Cl. 303—70)

This invention relates to air-brakes and particularly to a special inter-relation of a brake cylinder release valve and a retainer affording advantageous control and inhibiting misuse of the release valves.

The patents to Pickert #2,302,377, November 17, 1942, and #2,392,185, January 1, 1946, disclose self-restoring release valves designed for interposition between a brake controlling valve device and the brake cylinder controlled thereby. Such a valve can be operated to release a brake application on a car, without requiring bleeding of its reservoirs. The saving of compressed air thus effected is of great economic advantage, and the saving of the time required under past practice to bleed and recharge reservoirs is of even greater importance from the standpoint of expediting train movement.

Despite these advantages the suggestion has been made that the release valves can be misused under the following circumstances.

Suppose a train starts down a long grade with retainers set and stalls on the grade. Under the operating rules, the required procedure is to open enough retainers to permit the train to start.

This can, of course, be done with a train equipped with release valves; but the suggestion is made that brakemen could, and would, free the train by operating release valves. Since the resetting of the release valves of the type here under discussion depends on releasing flow through the brake controlling valve device, and since a set retainer limits such flow, brakes so released would remain inoperative as long as their retainers remain set. Conceding that such a practice, if followed as to a considerable number of cars, could create a dangerous condition, it is not believed that brakemen would indulge in a gross violation of operating rules, particularly where their own safety would be at stake. However, the release valve can be fool-proofed in this respect and thus be given new and valuable uses.

To this end the invention provides a simple means to suspend the action of the retainer as to any brake controlling valve device whose cylinder is vented by a release valve. This re-establishes the self restoring function of the release valve, so that even the possibility of a dangerous condition is eliminated. Moreover, the train can be started with all retainers set, simply by operating a few release valves which reset as their respective brakes release. One application will then reapply all the brakes so released and subject them to retainer control.

In its broadest aspect the invention involves venting the retainer pipe whenever the release valve is effective to vent the related brake cylinder. This can be accomplished in various ways, but the simplest and probably the best arrangement connects the retainer pipe with the related brake cylinder through a one-way flow valve which permits flow toward but not from the brake cylinder. Then the retainer pipe is vented whenever the related brake cylinder is vented. Thus, release flow can occur through the brake controlling valve device and cause the related release valve to reset.

A simple embodiment of the invention will now be described by reference to the accompanying drawing, in which the single figure is an axial vertical section of a release valve (of the type shown in Patent #2,392,185), connected according to the invention with an AB control valve, retainer valve and brake cylinder. In this view the control valve, retainer valve brake cylinder and pipe connections, all of which are commercially standardized, are drawn in miniature, to save space, thus permitting the release valve and related check valves to be shown on an adequate scale.

In the following detailed description of construction and operation reference will be made to the AB control valve not in a limiting sense, but as a typical brake controlling valve device.

The pipe bracket of an AB control valve is indicated at 6, the body of the emergency portion is indicated at 7, and the body of the service portion at 8. The usual reservoir bleed valve is indicated at 9. This bleed valve need not be dispensed with, but it would be supplanted for most purposes by the release valve of the present invention.

The brake pipe is indicated at 11 and has a branch which leads through a dust collector 12 to the pipe bracket. The brake cylinder connection appears at 13, the auxiliary reservoir connection at 14, and the supplemental reservoir connection at 15. Fragments of the two reservoirs appear in the drawing and are identified by legends.

A brake cylinder is indicated at 16. The release valve is interposed between the brake cylinder connection 13 and the brake cylinder 16. The main body portion of the release valve is shown at 21 and is in the form of a cored casting, having a chamber 22 and a chamber 23. Body 24 is mounted on a pipe bracket 25 which has chambers in free communication respectively with chambers 22 and 23, and in effect a part thereof. Pipe 13 connects with bracket 25 so as to communicate with chamber 22. Chamber 23 is in communication with brake cylinder 16 through pipe 24 which is connected to bracket 25 and to the brake cylinder.

The chambers 22 and 23 are separated by a downwardly presented valve seat 26. This seat is shown as formed on an insert or spider 27 which is sealed by gaskets 28 and 29 and which is clamped by a cap 31 of the form clearly shown in the drawing.

The cap 31 is bolted to the top of the housing 21 and clamps the peripheral margin of a flexible diaphragm 32 shown as of the slack or corrugated type.

The lower side of the diaphragm is subject to the pressure in the chamber 22. The diaphragm is subject on its upper side to pressure in a chamber 33 which is connected by a passage 34 with a chamber 35 formed in the lower end of the housing 21. The chamber 23 and the chamber 35 communicate with each other through the bore of a bushing 36 which is pressed into an opening extending between these two chambers. The bushing 36 has lateral ports 37 which communicate with an annular passage 38 and through the passage 38 with passage 34 and consequently with the chambers 33 and 35.

Controlling discharge from the bottom of the chamber 35 is an upwardly presented valve seat 39 formed on the upper end of a bushing which is pressed to place. A valve body 41 carries on its lower end a rubber faced valve 42 which normally seals against seat 39 and carries at its upper end a rubber faced valve 43 which may close against the seat 26 at which time the valve 42 will be lifted from its seat 39.

The valve 42 is shown in the drawing as a separate component connected to the valve body 41 by a machine screw. The valve 43 is formed integrally with the body. An upwardly extending stem 44 passes through the center of the diaphragm 32 and is clamped to the center of the diaphragm by a flanged sleeve 45, a thrust plate 46, which overlies the diaphragm, and a nut 47.

The extreme upper end of the stem 44 projects above the nut 47 and is reduced in diameter as indicated at 48. This reduced end 48 is guided in a bushing 49 pressed into the cap 31. A biasing spring 51 of moderate strength urges the diaphragm 32, the stem 44 and the valve body 41 downward so that the valve 42 is normally seated and the valve 43 is normally unseated. The valve body 41 has a peripheral flange or rim 52 which encircles it between the valves 42 and 43, the flange being so located that when valve 42 is closed, the flange 52 fully exposes the ports 37. However, if the body 41 is moved upward sufficiently to close the valve 43 against the seat 26, the ports 37 are throttled but not completely closed.

The valve body 41 is centered and guided in the bushing 36 by radial wings 53.

A housing 54 of the form shown is attached to the bottom of the housing 21 by machine screws, one of which appears at 55. The housing 54 has an integrally flanged opening in its lower end in which is mounted a universally tiltable actuator comprising a ported head 56 which seats at its margin on the internal flange in housing 54 and which has at its lower end a fork 57 to which an actuating rod may be attached.

Resting on the head 56 is the lower end of a stem 58 which is guided by a guideway formed in a spider 59 clamped between the housings 21 and 54. The rim of the spider has throughports as shown. The stem 58 is biased downwardly by a spring 61. If the head 56 is tilted in any direction the effect is to force the stem 58 upward, and since the stem 58 is aligned with the valve body 41, the effect of tilting the head 56 is to force the valve body 41 upward against the resistance of spring 51 so as to open the valve 42, throttle the ports 37 and close the valve 43.

The structure so far described conforms to the disclosure of Patent #2,392,185.

The exhaust of the AB control valve is connected to retainer pipe 62 which leads to retainer 63. This can be of any desired type but is shown as of the standard four-position type.

In position 1 of the retainer, free exhaust is afforded; in position 2, ten pounds, and in position 3, twenty pounds brake cylinder pressures are retained, while position 4 affords a slow or restricted release flow.

Bolted to bracket 25 is a check valve body 64 in which are two check valves arranged in series, a ball check valve 65 and a rubber faced check valve 66 lightly urged to its seat by coil compression spring 67. A flow limiting choke 68 is provided to limit flow if the check valves should leak. A branch pipe 69 leads from the retainer pipe 62 to bracket 25 through which it is connected with choke 68. The space above check valve 66 is in free communication with chamber 23, and hence with brake cylinder 16 and chamber 33 of the release valve.

*Operation*

Since the retainer is ineffective to prevent or limit releasing flow through the control valve when the release valve is open, the release valve can reset without any interference by the retainer. Hence, the release valve can always perform, in the manner described in the Pickert patents, all the functions which it was originally designed to perform. It will release the brakes and preserve the reservoir charges in a car cut out for switching.

In addition, the release valves on one or more cars can be used safely to free a train stalled on a grade with retainers set. If the release valves are operated while the control valves are in release position, each release valve vents its brake cylinder and at once resets. Thus, the corresponding retainers remain set and subsequent applications and releases are subject to retainer control, a distinct advantage under some conditions. This operation can be used safely on grades to start after a stall without manipulating any retainers.

While the invention has been described and discussed as used with a control valve of the AB type, it is available for use between any control valve and its brake cylinder. It is peculiarly valuable with the AB control valve because that valve is used for freight service and requires large reservoir volumes. Furthermore, freight trains are very long so that the time required for charging reservoirs entails serious delays in train movement. The device can, however, be used with a single reservoir control valve, such for example as the well known K type triple valve. It can be used also with control valves on passenger cars.

What is claimed is:

1. The combination of a brake controlling valve device having a brake cylinder connection and an exhaust connection; a retainer applied to said exhaust connection and settable to a retaining position in which it limits exhaust flow; a brake cylinder connected with said brake cylinder connection; a release valve interposed in the last named connection and having a normal position in which it opens the connection and an abnormal position in which it closes the connection and vents the brake cylinder; manually operable means for shifting said release valve to said abnormal position; resetting means responsive to exhaust flow through the brake controlling valve device and then serving to return the release valve to normal position; and means effective in the abnormal position of the release valve to suspend the exhaust limiting function of the retainer.

2. The combination of a brake controlling valve device having a brake cylinder connection and an exhaust connection; a retainer applied to said exhaust connection and settable to a retaining position in which it limits exhaust flow; a brake cylinder connected with said brake cylinder connection; a release valve interposed in the last named connection and having a normal position in which it opens the connection and an abnormal position in which it closes the connection and vents the brake cylinder; manually operable means for shifting said release valve to said abnormal position; resetting means responsive to exhaust flow through the brake controlling valve device and then serving to return the release valve to normal position; and means effective in the abnormal position of the release valve to afford an auxiliary flow passage from the exhaust connection of the brake controling valve device to atmosphere.

3. The combination defined in claim 2, in which said auxiliary flow passage leads from the exhaust connection of the brake controlling valve device to a space in communication with the brake cylinder, and one-way flow valve means are interposed in said flow passage and serve to permit flow toward the brake cylinder and inhibit reverse flow.

4. The combination defined in claim 2, in which said auxiliary flow passage leads from the exhaust connection of the brake controlling valve device to a space in communication with the brake cylinder, and a flow restrictor and one-way flow valve means are interposed in said flow passage and serve to permit flow toward the brake cylinder and inhibit reverse flow.

5. The combination of a brake controlling valve device having an exhaust passage; a retainer valve settable to limit flow through the exhaust passage of the brake controlling valve device; a brake cylinder connected to be controlled by said brake controlling valve device; and a self-restoring releasing mechanism interposed in said connection, and comprising a releasing valve having a normal position in which it connects the brake cylinder and brake controlling valve device and an abnormal position to which it may be shifted and in which it isolates and vents said brake cylinder and opens a secondary exhaust path from the exhaust passage of the brake controlling valve device, yielding means biasing said releasing valve toward said normal position, a normally inert pressure motor serving when energized to hold said releasing valve in said abnormal position against the urge of said biasing means, means associated with said releasing valve and serving in said abnormal position to energize said motor with fluid pressure maintained by the brake controlling valve device, and manually operable means for shifting said release valve to its abnormal position.

6. The combination of a brake-controlling valve device having an exhaust passage and a brake cylinder connection; a retainer settable to limit flow from the exhaust passage; a brake cylinder connected with said connection; a self restoring releasing mechanism interposed in said connection and comprising an expansible chamber motor having two working spaces separated by a movable abutment the first working space being subject to braking pressures established by the brake controlling valve device, a release valve connected with said abutment to be shifted thereby between two positions, namely a normal position assumed when the abutment is shifted toward the first working space and in which the release valve connects the brake cylinder and the brake controlling valve device and also connects the two working spaces, and an abnormal position in which the valve interrupts the two connections just mentioned and vents the brake cylinder and the second working space, yielding means insufficient to resist effective braking pressure in the first braking space and serving to bias the abutment toward said normal position and manually operable means for causing said valve to shift to said abnormal position; and a connection affording an auxiliary vent from the exhaust passage of the brake controlling valve device and controlled by said release valve so as to be open in the abnormal and closed in the normal positions thereof.

7. The combination defined in claim 6, in which the auxiliary vent communicates with the brake cylinder, so as to be vented when the brake cylinder is vented, and a check valve is interposed to preclude outflow from the brake cylinder through said auxiliary vent.

8. The combination of a brake controlling valve device having an exhaust connection and a brake cylinder connection; a retainer valve having a release setting and a pressure retaining setting; a check valve; a brake cylinder; flow connections from the exhaust connection to the retainer, and through the check valve to the brake cylinder; a flow connection between the brake cylinder connection and the brake cylinder comprising a release valve having a normal position in which it opens said connection and an abnormal position in which it closes said connection and vents the brake cylinder, said release valve including pressure responsive means serving to retain it in abnormal position when subjected to brake applying pressure by the brake controlling valve device and to restore it to normal position when said pressure is released by the brake controlling valve device; and operator-operated means for moving said release valve to said abnormal position.

WILLIAM F. KLEIN.